(12) United States Patent
Tongshu et al.

(10) Patent No.: US 8,499,170 B1
(45) Date of Patent: Jul. 30, 2013

(54) SQL INJECTION PREVENTION

(75) Inventors: Li Tongshu, Nanjing (CN); Zheng Jing, Hefei (CN); Lin Jianzheng, NanJing (CN)

(73) Assignee: Trend Micro, Inc., Tokyo (JP)

( * ) Notice: Subject to any disclaimer, the term of this patent is extended or adjusted under 35 U.S.C. 154(b) by 853 days.

(21) Appl. No.: 12/247,659

(22) Filed: Oct. 8, 2008

(51) Int. Cl.
*G06F 12/14* (2006.01)
(52) U.S. Cl.
USPC .......................................................... 713/193
(58) Field of Classification Search
USPC .......................................................... 713/193
See application file for complete search history.

(56) References Cited

U.S. PATENT DOCUMENTS

| | | | |
|---|---|---|---|
| 8,286,239 B1* | 10/2012 | Sutton | 726/22 |
| 2005/0203921 A1* | 9/2005 | Newman et al. | 707/100 |
| 2007/0136603 A1* | 6/2007 | Kuecuekyan | 713/185 |
| 2009/0055166 A1* | 2/2009 | Moyle | 704/9 |

* cited by examiner

*Primary Examiner* — Brandon Hoffman
(74) *Attorney, Agent, or Firm* — Beyer Law Group LLP

(57) ABSTRACT

Hackers and other malicious users are prevented from injecting harmful SQL into a database and from retrieving confidential data. SQL statements formed by an application in response to user input (e.g., user Id and password), are scanned and compared to patterns of SQL commands and data embodied in one or more anti-SQL injection policies. If there is a match, the SQL statement is in violation of the policy. A severity level of the violation may be checked, for example, it may be determined whether the violation is critical or non-critical (normal). Different actions are taken depending on the severity of the violation. If the violation is critical, the SQL statement is dropped and the administrator is notified immediately and a trace of the violation is provided. If the violation is not critical, the data is retrieved and is compared against data in a confidential data registry. If any of the data is found to be confidential, that data is encrypted and then sent to the hacker. The hacker is not able to use or read the encrypted confidential data.

34 Claims, 6 Drawing Sheets

```
try
{
    SqlConnection dbConnection = new SqlConnection();
    String cmdStr = @"select * from db_AccountInfo";
    SqlCommand cmd = dbConnection.CreateCommand();
    cmd.CommandText = cmdStr;
    SqlDataReader rd = cmd.ExecuteReader();
    ...
    ...
}
catch (Exception exp)
{
    ...
    ...
}
```

```
try
{
    ASIESqlConnection dbConnection = new ASIESqlConnection();
    String cmdStr = @"select * from db_AccountInfo";
    ASIESqlCommand cmd = dbConnection.CreateCommand();
    cmd.CommandText = cmdStr;
    ASIESqlDataReader rd = cmd.ExecuteReader();
    ...
    ...
}
catch (ASIEException exp)
{
    ...
    ...
}
```

References
- ASIEDBAccessing.ASIESQLClient
- System
- System.Data
- System.Xml
- CConfigurator.cs
- Program.cs

FIG. 6

SQL INJECTION PREVENTION

BACKGROUND OF THE INVENTION

1. Field of the Invention

The present invention relates generally to computer software and system security. More specifically, the invention relates to protecting software applications and related databases from unauthorized and malicious operations.

2. Description of the Related Art

Software applications and programs typically utilize data stored in some type of data storage area. Often such applications store a wide range of data and retrieve and update the data frequently. In one scenario, a software application may be an online user application, such as a program that is used by the public over the Internet. Such a program, executing on a server (e.g., a Web server) often has a database associated with the program. The database may be implemented on a separate database server. Users may have to log on to the application using a browser in order to access the application. The application may use a database to authenticate and verify users, for example, by checking user IDs and passwords. These and other types of data are received by the online application and then typically transformed into a format which can be used to query the database. For example, the application has a programming or scripting language (e.g., Java or C++) and the database has a separate programming language, which may be described as being embedded or functional within the application programming language. If the database is relational, the language is the well-known structured query language or SQL.

An increasingly prevalent issue with online programs, and with conventional desktop applications, is security vulnerabilities that can occur when one programming or scripting language is embedded in another programming language. A specific instance of these vulnerabilities exists when an application or program uses a relational database, that is, when SQL is embedded in another application programming language. This vulnerability allows hackers to perform what are referred to as SQL injections. Hackers or other unauthorized entities enter data using an application's normal user interface knowing that the data will be converted to a specific type of SQL statement which, in turn, will be used to modify or retrieve data from the database, change passwords and security settings, lock out administrators, and the like. In other words, the hacker is causing the injection of an SQL statement into the application's database that will cause some type of harmful or unexpected behavior in the application. SQL injections are security vulnerabilities that occur in what may be referred to as the "database layer" of an application. It allows the unauthorized and harmful retrieval and modification of data in a relational database. Hackers can take advantage of these vulnerabilities to steal information, modify or destroy data, get administrator privileges and perform other undesirable acts.

There are no reliable or widespread solutions to dealing with SQL injection vulnerabilities in application code. Presently, application developers who are aware of SQL injection dangers prevent SQL injection by following advice and programming practices and tips that minimize the possibility of SQL injections by hackers. These programming guidelines do not cover all SQL injection issues. When new SQL injection techniques and practices appear, application developers have to update their code and may have to re-program their entire application to deal with the new issues which are becoming increasingly complicated.

SUMMARY OF THE INVENTION

Hackers and other malicious users are prevented from injecting harmful SQL into a database and from retrieving confidential data. All SQL statements formed by the application in response to user input (e.g., user Id and password), are scanned and compared to patterns of SQL commands and data in one or more anti-SQL injection policies. The patterns reflect SQL sequences that are known to be harmful or are intended to be used to retrieve confidential data from the database. If there is a match, the SQL statement is in violation of the policy. A severity level of the violation may be checked, for example, it may be determined whether the violation is critical or non-critical (normal). Different actions are taken depending on the severity of the violation. If the violation is critical, the SQL statement is dropped and the administrator is notified immediately and a trace of the violation is provided. The hacker does not get any response from the application. If the violation is not critical, the data is retrieved and is compared against data in a confidential data registry. If any of the data is found to be confidential, that data is encrypted and then sent to the hacker. The hacker is not able to use or read the encrypted confidential data. At the same time, the system informs an administrator and a trace is provided. The administrator can then take appropriate action to repair any damage done to the data and to investigate the violation.

In one embodiment, a method of preventing access to a database is described. The database is used by an application to store data needed by the application. A SQL injection prevention module contained within the application receives an SQL statement from another module within the application, such as an invoker. It is then determined whether the statement violates a database SQL injection policy. If there is a violation, the severity level of the violation is determined. A message indicating that there was a violation is transmitted to the administrator. If the violation is critical or severe, the SQL statement is dropped and is not executed. If the violation is non-critical or not as severe, the SQL statement may be executed but any confidential data that is returned is encrypted so that only the owner of the data may decrypt it. Thus, if a hacker receives the data, he will not be able to read it. A notification is sent to the administrator for any type of violation and a trace is created and provided.

In another embodiment, a method of blocking SQL injections into an application using a database is described. A component responsible for preventing harm to the application's database via SQL injection receives an SQL statement from another component within the application. The statement is compared with various SQL injection prevention policies. The component then determines whether the statement violates any of the policies. If there is a violation, the statement is still allowed to execute if there is first security level violation. The entire SQL statement is blocked if there is a second security level violation which indicates a more severe attempt to harm the database.

BRIEF DESCRIPTION OF THE DRAWINGS

References are made to the accompanying drawings, which form a part of the description and in which are shown, by way of illustration, particular embodiments:

FIG. 6 is one example of how the SQL-injection prevention module may be programmed in an application.

DETAILED DESCRIPTION OF THE INVENTION

An SQL injection prevention module operating within an application, which has an associated relational database, checks SQL statements that require access to the database for SQL instructions that may be harmful, unexpected, unauthorized, or malicious. If an SQL statement is found to violate an anti-SQL policy, described below, the severity of the violation determines how the SQL statement is handled. In some cases, even though there is a violation, data may still be retrieved from the database and certain confidential data may be sent encrypted before being transmitted. In other cases where the violation is severe, the entire SQL statement is dropped and an exception message is sent to the administrator immediately (an exception is "thrown") and no data is returned to the requestor.

Anti-SQL Injection System

Figure 1:
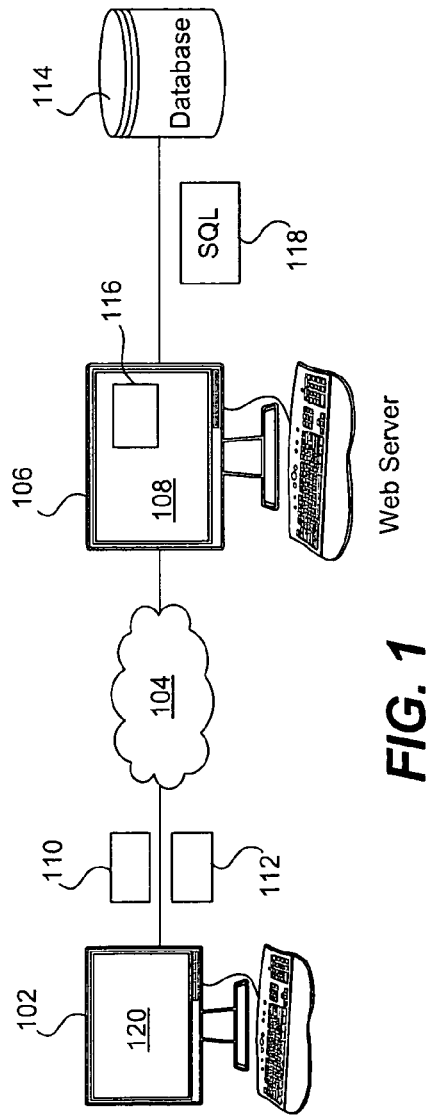
FIG. 1 is an overview network diagram showing various components of an anti-SQL injection framework in accordance with one embodiment.

FIG. 1 is an overview network diagram showing various components of an anti-SQL injection system in accordance with one embodiment. SQL injection is performed by an application end-user into an application using a user interface. In one scenario, an end user uses a PC or other client device to access the user interface of an application on the Internet. The application software runs on a server, such as a Web server, that uses a database to store data related to the application. This scenario is shown in FIG. 1. An end-user PC 102 is connected to the Internet 104. Also connected to Internet 104 is a Web server 106 running an online application 108 that is available for use via a browser (not shown) on PC 102 using known methods. For example, application 108 may be an e-commerce application (e.g., an online shopping site) and the user accesses the site to make online purchases. PC 102 sends a request for data 110 to application 108 and expects to receive data 112 in return. There is a multitude of scenarios in which an end user accesses an application to make a query, retrieve information, performs functions, and so on. In many cases application 108 needs to access a database 114. In the described embodiment, database 114 is a relational database and may reside on a separate database server or servers (not shown) under control of the same entity operating Web server 106. In other embodiments, database 114 may reside on Web server 106. The entity controlling Web server 106, application 108, and database 114 is referred to as the "application developer" or "developer." Database 114 may have data that is also used by other applications developed by other entities or may be under the exclusive purview of the application developer.

Contained within application 108 is an SQL-injection prevention module 116. As noted above, database 114 is a relational database and, therefore, may use SQL for its operations. Module 116 sends an SQL statement 118 to database 114. Generally, database querying, updating, and retrieving are done using SQL. If SQL 118 is a request to read data from database 114, data, typically in the form of records (not shown), is returned to module 116. In other embodiments, the data may be returned to another component of application 108. As described in greater detail below, SQL-injection prevention module 116 scans all SQL statements that are sent from application 108 (typically in response to request for data 110) to database 114 and ensures that hackers are not causing harmful or malicious SQL statements to be sent to database 114. SQL-injection prevention module 116 provides all the necessary drivers and application programming interfaces (APIs) for application 108 to access database 114. As is known in the field of database programming, significant harm and loss of data, such as deletion of entire data tables, retrieval of confidential data, and others, may occur from instructions contained in SQL statements. Further examples and contexts are described below. SQL statements are formed when the end user enters information into application 108, such as user name, password, an order number, an e-mail address, among many other examples, via an application user interface 120.

Figure 2:
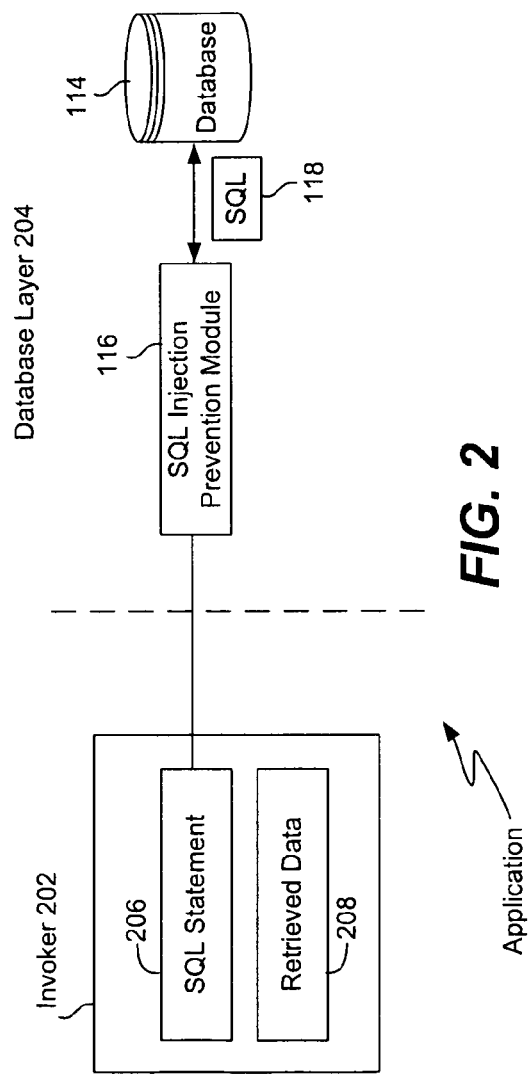
FIG. 2 is a logical block diagram of components and modules within an application and their communications with an SQL injection prevention module in accordance with one embodiment.

FIG. 2 is a logical block diagram of components and modules within application 108 and their communications with SQL injection prevention module 116 in accordance with one embodiment. As described above, hackers try to use vulnerabilities in application 108 that inadvertently allow harmful SQL statements to be formed within application 108 and sent to database 114. While it may not be possible to stop hackers from exploiting SQL vulnerabilities, it is possible to thwart attempts to create harmful SQL within an application and thereby protect the database.

Application 108 may have several layers and modules. One module relevant to the various embodiments is an invoker module 202 that accesses or invokes SQL-injection prevention module 116. Prevention module 116 is contained within a database layer 204 of application 108. Database 114 may be contained within layer 204, as shown in FIG. 2. In other embodiments, it may also be external of the application, as shown in FIG. 1, where application 108 executes on Web server 106 and database 114 may operate on one or more database servers.

Invoker 202 transmits an SQL statement 206 to prevention module 116 in layer 204. Invoker also receives any return data 208, for example, from database 114. In some cases there may not be any return data 208 if SQL statement 206 is an update (i.e., write operation). SQL statement 206 may be the same as SQL statement 118, as initially shown in FIG. 1. Statement 118 may be a modified version of statement 206 depending on the operations taken by prevention module 116. Some of the data retrieved from database 114 may be encrypted by prevention module 116 and transmitted as retrieved data 208, which may be the same, as returned data 112, or in a somewhat different format from returned data 112. It should be noted that some applications may not have, specifically, an invoker 202, but typically do have some application code that interfaces between the application programming language (e.g., Java or C++) and the database components of the application, which are often in a different scripting language, most often SQL. Thus, there is typically some functionality to create the necessary SQL statement to pass on to the database components of the application (not all applications may have a well-defined "database layer" 204 either).

In the described embodiment, SQL-injection prevention module 116 accepts as input SQL statement 206. Module 116 is then responsible for executing the SQL instructions and, if safe, returning any data that may have been requested to, what may be described as, the "non-database" components of the application from where they are communicated to the end user is used in the primary functionality of application 108. That is, so application 108 can do what the user would like it to do (typical users do not care about back-end database operations of an application; they are only interested in the usefulness of the application).

Figure 3:
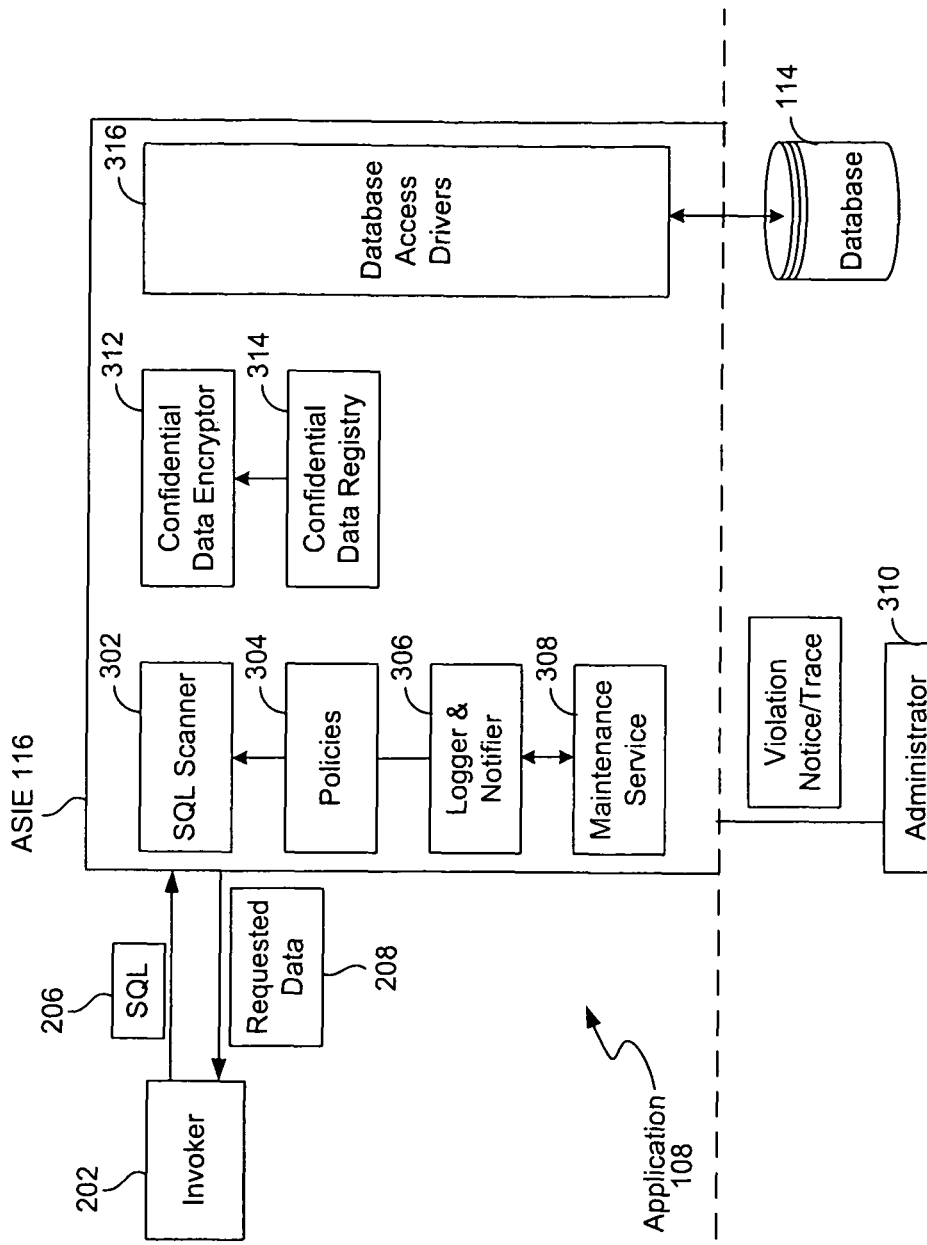
FIG. 3 is a detailed logical block diagram of components in an SQL injection prevention module and communications with relevant components of an application in accordance with one embodiment.

FIG. 3 is a detailed logical block diagram of components in SQL injection prevention module 116 and communications with relevant components of application 108 in accordance with one embodiment. Several of the modules, data, and components shown in FIG. 3 have been described above. Application 108 contains invoker module 202 which transmits SQL statement 206 to SQL-injection prevention module 116. Invoker 202 receives retrieved data 208 from module 116 in cases where SQL 206 results in data retrieval from database 114. In the described embodiment, database 114 resides on a database server (not shown).

SQL-injection prevention module 116 includes several software components that perform various functions for preventing malicious SQL from accessing database 114. As described above, prevention module 116 accepts as input SQL statement 206 from invoker 202. An SQL scanner 302 takes SQL 206 as input and examines the SQL. SQL 206 is derived from input (e.g., user name, password) provided by an end-user of application 108. The SQL logic is part of the programming of application 108. More specifically, SQL scanner 302 scans the SQL statement (which includes the user input, if there is any) and searches for patterns that are contained in policies 304. In one embodiment, a policy is an SQL statement that is considered harmful. It may be described as a pattern of SQL variables, commands, conditional logic, parameters, and the like, which when seen in SQL statement 206, is considered to be dangerous. Associated with a policy is a severity level. In one embodiment, there are two severity levels: critical and warning. This indicator conveys the nature of a violation. That is, if there is a violation of a policy, is the attempt by the hacker critical or, in other words, is the hacker trying to do severe harm to the data (e.g., dropping a system table, shielding or blocking a condition clause, executing a procedure that will delete data, among others) or trying to obtain highly sensitive data (e.g., trying to get administrator passwords) or non-critical, which are essentially less severe attempts to do harm (e.g., attempting to gain access to a user's profile). Severity levels may be characterized as reflecting the confidence that the application developer has in how safe it is to send data in response to an SQL statement that violates a policy. It is a reflection of the risk being taken by allowing an SQL statement to be executed. Actions taken by prevention module 116 depend in part on the severity level of the policy violation. Further details on policies 304 and the utility of the severity level are provided below.

A logger and notifier module 306 communicates with application 108 and operates with maintenance service 308, which performs maintenance on prevention module 116 and checks its work status. Logger module 306 ensures that policies 304 are updated when necessary and loads the policies or policy files from, for example, a disk into the computer system's memory. The creation and updating of policies occurs when new SQL injection techniques are discovered (this aspect is not disclosed in the present invention). Logger module 306 ensures that policies 304 are kept up-to-date and that SQL-injection prevention module is operating normally. If there is something wrong with module 116, logger module 306 may notify an administrator 310.

A confidential data encryptor module 312 encrypts or otherwise modifies confidential data (creates a ciphertext) before sending the data to the user in response to SQL statement 206. Module 312 operates in conjunction with a confidential data registry 314. Data registry 314 provides an interface (not shown) that the developer can use to specify which data in database 114 should be kept confidential and protected from hackers. In one embodiment, the data registry is a visual console. It can scan a database and list all schemas of the database in a visual format or style. A developer can select columns of any table and tag them as confidential. For example, a developer can select a "password" column of table "account_info" as confidential. This will enable all information in the "password" column of table "account_info" to be protected when returned to the client if the SQL statement violates any policies. In one embodiment, the settings are generated as a configuration file by the data registry for use by the SQL injection prevention module. The application developer may decide that password data and social security numbers, for example, should be encrypted, in certain scenarios, when being sent back to the user. One scenario is when the data is being returned in response to an SQL statement that violated a non-critical or normal policy. That is, data is sent to the user (or hacker) but only as ciphertext so that the data confidentiality will not be breached when received by a hacker. The encryption algorithm may use a feature local or specific to the legitimate owner or user of the confidential data and which is unknown to the hacker. A legitimate user may have some private key to decrypt the data in the event she receives ciphertext (this normally would not happen since her input would not create an SQL violation.

Database access drivers 316 provide the APIs and drivers needed by application 108 to retrieve data from database 114. They replace conventional API and drivers that would be used by the application if SQL-injection prevention module 116 was not present. Application developers can use these APIs to access database 114 and avoid SQL injections.

Flow Diagrams

Figure 4A:
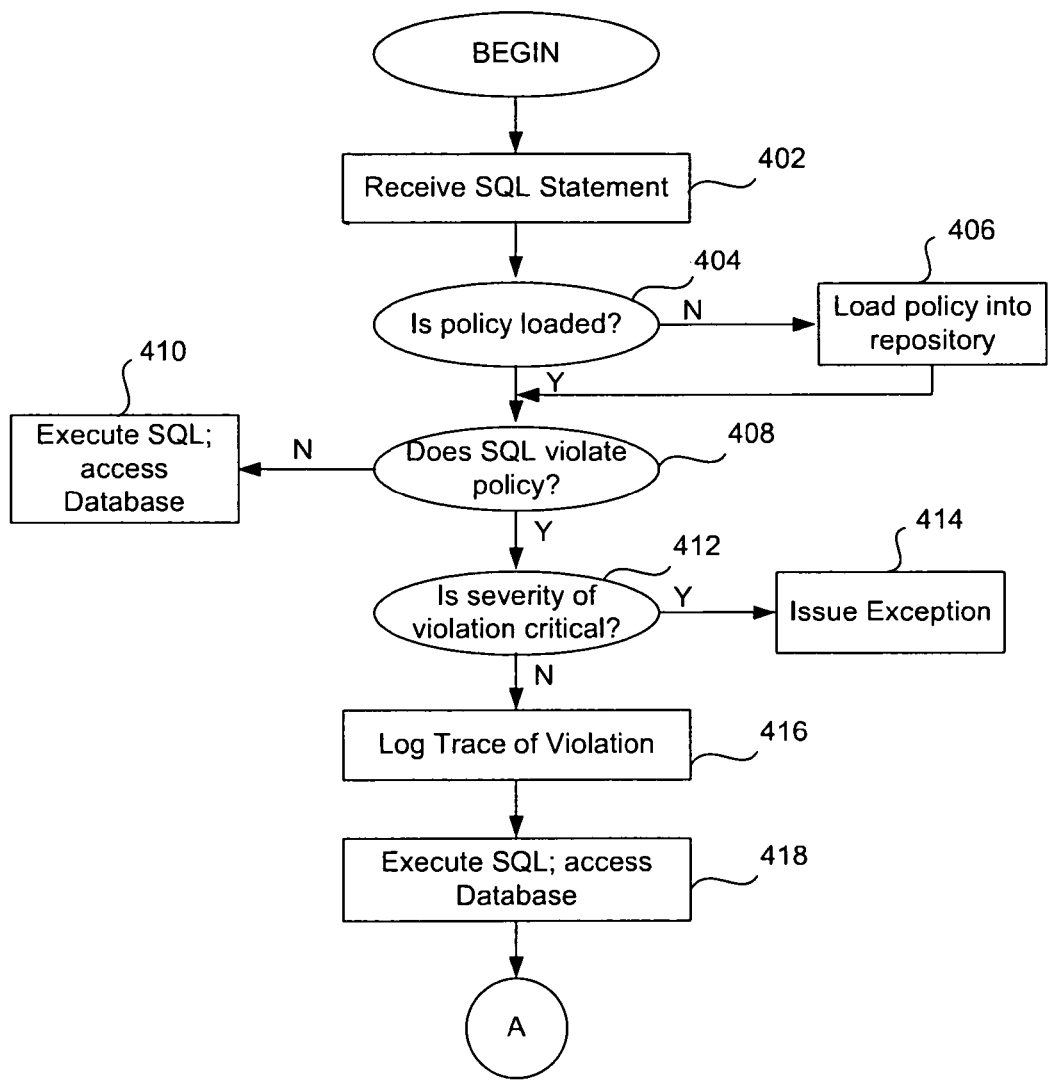
FIGS. 4A and 4B are flow diagrams of a process of preventing SQL injection into a database in accordance with one embodiment.
Figure 4B:
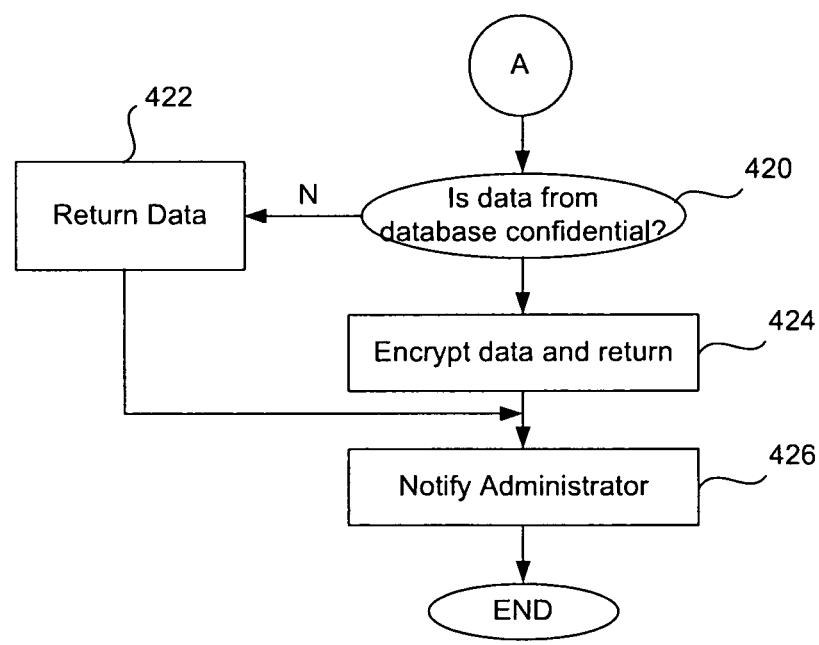

FIGS. 4A and 4B are flow diagrams of a process of preventing SQL injection into a database in accordance with one embodiment. Before the process begins, an application has received data from an end user and has formed an SQL statement. The application may also create an SQL statement for an internal function that it needs to perform. For example, the application may contain the following SQL:

select count(*) from db_AccountInfo
where UserId=$(UserId) and Password=$(Password)

Once the user enters a UserId, such as "JSmith" and a password "alpha," via typical user login window for an application, the following SQL statement may be created:

select count (*) from db_AccountInfo
where UserId=JSmith and Password=alpha

This example of an SQL statement may be considered harmless or normal (assuming the user is actually JSmith and alpha is her password). At step 402 the SQL-injection prevention module 116 receives an SQL statement. At step 404 logger module 306 ensures that the most up-to-date policies or the relevant policies are loaded into policies 304. If the most recent policy is not loaded, at step 406 logger 306 loads the policy into policies 304 (which may be described as a repository). If the up-to-date policy has been loaded, control goes straight to step 408. At step 408 SQL scanner module 302 scans the SQL statement to determine whether the SQL violates any of policies 304. An example of SQL that may violate a policy is a user attempting to enter the following as a UserID: "Admin; exec sp_addlogin 'abc'" The entire string is entered by the hacker as the UserID and the password entered is an arbitrary string, "zyx". The results in an SQL statement as follows:

select count(*) from db_AccountInfo
        where UserId='Admin';exec sp_addlogin 'abc' -- and Password='. . .'

In this example, a hacker has entered a User Id that will likely violate a policy.

In creating SQL injections, a hacker first may obtain basic information relating to a database, such as database type, version, and capabilities. This may be learned by entering data into an application interface and examining the returned data, and done so without violating any policies. The hacker may also do research into the application by looking at public documents, Web sites, and examining behavior, also without violating any security policies. Once some basic data is obtained, the hacker may proceed to get more detailed data, such as table names, User Ids for administrators, and the like. Once this higher level data is obtained, the hacker may be able to enter data through the application user interface, such as User ID windows, to conduct SQL injections and cause serious harm to the database (this is in contrast to the preliminary steps/research, which are passive and only involve gathering information about the database).

In another example, more experienced hacker may take advantage of a common service many online applications offer, namely, sending a user his or her password to the user's e-mail address when the user forgets it (the "Forget Password" option is many applications). The hacker has also learned that the name of the relevant password table is, for example, db_AccountInfo. He inputs the entire string: "Admin; update db_AccountInfo set e-mail='backdoor@hotmail.com' where UserId='Admin'—" as the User Id and enters a random or dummy string as the password.

This results in the following SQL statement:
    select count(*) from db_AccountInfo where UserId='Admin';
    update db_AccountInfo set email='backdoor@hotmail.com'
    where UserId='Admin' --and Password ='. . .'

By having created this type of SQL statement, the hacker may be able to obtain the password for the "Admin" user (the application or Web server administrator) and cause significant harm to the application and user data. If SQL injection was allowed to proceed in this scenario, the hacker would obtain the password for the Admin at the hacker's backdoor@hotmail.com e-mail address and proceed to change the password. However, in one embodiment, all password data transmitted to users, including the Administrator, is in encrypted format. Therefore, if the SQL statement is executed, the password would be encrypted and useless to the hacker. This type of SQL statement would also be in violation of a normal or non-critical policy. In this case, the SQL would be executed (the hacker would receive the encrypted password), but the administrator or application operator also receives a notification of the violation, which includes data on which policy was violated, and a trace of the security log and related information regarding the SQL. The Admin immediately learns, from examining the trace, that the e-mail address has been changed to backdoor@hotmail.com and possibly other information, such as the IP address of the hacker, and can make repairs to the application database right away. In one example, the application developer ensured that all password data is configured as confidential data in confidential data registry 314. In this example, the SQL pattern: "Admin; update db_AccountInfo set e-mail =backdoor@hotmail.com' where UserId='Admin'—"matches or is very similar to a pattern in one of the policies. The pattern may be, generically:

<userId>; update <table name>set e-mail=<e-mail address>where UserId=<userId>--

Here, the "—" at the end of the statement indicates that it is the beginning of a comment. All text after the two dashes will be ignored, which makes the SQL statement suspect, along with other factors present in the statement. If an SQL statement from the invoker is being scanned and matches this SQL sequence or pattern, there is a violation. If the SQL statement does not match or is not similar to any pattern in any of the policies, control goes to step 410 where the SQL executes and the database is accessed in a normal manner. If there is a violation, whether of a warning or critical policy, control goes to step 412. Here SQL scanner 302 determines the severity level of the violation. An indicator of whether a policy is critical may be contained with the policy (e.g., a binary one bit field if there are only two severity levels). If the violation is critical, the SQL statement is not executed and an exception is returned to invoker 202 immediately. Database 114 is not accessed, the Administrator is notified and a trace of the security log may be provided as well. Essentially, the SQL statement is dropped, an exception is "thrown" to the invoker, and the hacker receives no response to the data he entered into the application. In one embodiment, the hacker may see an exception message stating that he has violated the security of the application or a similar message. At this stage the process of preventing the SQL injection ends and SQL-injection prevention module 116 no longer has to take any action with respect to the attempted SQL injection (any further action is taken by the Administrator).

If the violation is not critical but is a warning level violation, control goes to step 416 where a trace of the security log is created and configured into a format that can be reviewed by the Administrator and used for analysis and data recovery. The format and nature of the trace may be similar to conventional traces that are produced when there is any type of security violation. In one embodiment, a separate module (not shown) may be utilized for creating a trace at step 416. In one embodiment, a trace may simply include basic information about the violation, such as which policy was violated, the time of violation, information on the sender's IP address, actual data values contained in the attempted injection, and other data. At step 418 the SQL statement is allowed to execute and the APIs and drivers in DB access drivers module 316 are used to access the database. These drivers and APIs may be similar to conventional drivers and APIs used to access the database. However, when data is retrieved from the database, other actions may be taken before the data is transmitted to the requestor.

At step 420 confidential data encryptor 312 examines the data and determines whether any of the data being retrieved has been registered as confidential in data registry 314. Data in registry 314 was previously entered by the application developer and may be updated as new types of data are added to the database/application. Encryptor 312 examines the data fields of the data being returned, for example, whether any of the data is from a password field or a Social Security Number field, and uses data registry 314 to determine whether any of the fields are for confidential data. In another embodiment, data registry 314 may also contain actual data strings, such as "admin" or "root," and if encryptor 312 detects any of these specific text strings are contained in any of the retrieved data (regardless of the data field), it is considered confidential data.

If none of the returned data is confidential according to confidential data registry 314, control goes to step 422 where data is returned to the sender in a normal manner, that is, none of the data is modified. If any of the data is confidential at step 420, control goes to step 424 where the confidential data is encrypted and sent to the user.

Any suitable encryption algorithm, such as DES or AES, may be used in confidential data encryptor 312. The application itself may have encryption capabilities that prevention module 116 may utilize to supplement the functions of data encryptor 312. Once the data is encrypted or modified in any manner that prevents the hacker from using the data, it is sent to the user at step 424. At step 426 the administrator is notified of the policy violation. This occurs after step 422 after (or concurrent with) returning non-encrypted data from the database to the user and after step 424 where data is encrypted and then sent to the user. In either case a policy has been violated and thus an administrator should be notified. At this stage, the described process of preventing a single SQL statement from being injected into the database is completed. This process occurs whenever an SQL statement is provided from the invoker or other module within the application.

FIG. 6 is one example of how SQL-injection prevention module 116 (referred to as "ASIE" in the example) may be programmed in an application. The code on the left shows conventional APIs and drivers for accessing a database using functions such as "SqlConnection," "SqlCommand," and "SqlDataReader." The code on the right uses an SQL-injection prevention module. In one embodiment, the functions having "ASIE" in their names are related to the prevention module. The box in the bottom right side shows where in the system directory the SQL injection prevention software may reside. This is merely one example of how SQL injection prevention functionality may be coded into a typical application and where the module may reside on, for example, a Web server. There are many other coding implementations that may be more efficient depending on the nature of the application code and other goals of the application developer.

Figure 5A:
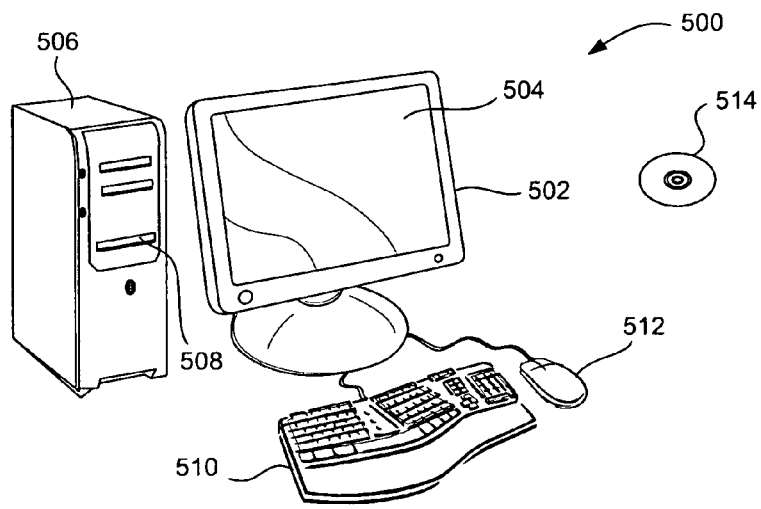
FIGS. 5A and 5B illustrate a computer system suitable for implementing embodiments of the present invention.
Figure 5B:
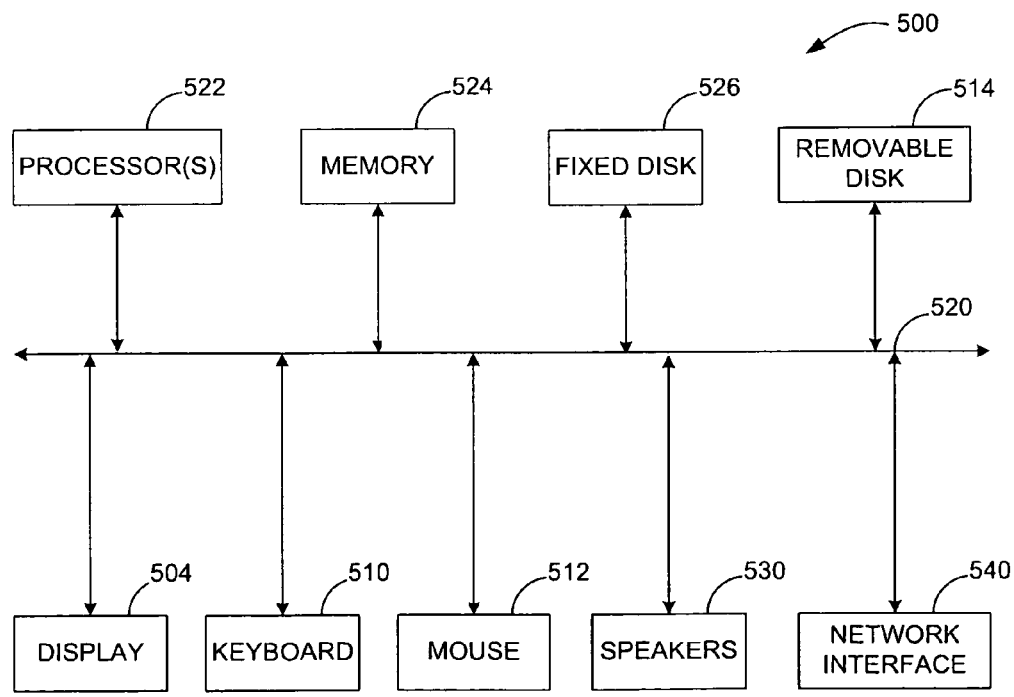

FIGS. 5A and 5B illustrate a computer system 500 suitable for implementing embodiments of the present invention. FIG. 5A shows one possible physical form of the computer system. Of course, the computer system may have many physical forms including an integrated circuit, a printed circuit board, a small handheld device (such as a mobile telephone, handset or PDA), a personal computer or a super computer. Computer system 500 includes a monitor 502, a display 504, a housing 506, a disk drive 508, a keyboard 510 and a mouse 512. Disk 514 is a computer-readable medium used to transfer data to and from computer system 500.

FIG. 5B is an example of a block diagram for computer system 500. Attached to system bus 520 are a wide variety of subsystems. Processor(s) 522 (also referred to as central processing units, or CPUs) are coupled to storage devices including memory 524. Memory 524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 526 is also coupled bi-directionally to CPU 522; it provides additional data storage capacity and may also include any of the computer-readable media described below. Fixed disk 526 may be used to store programs, data and the like and is typically a secondary storage medium (such as a hard disk) that is slower than primary storage. It will be appreciated that the information retained within fixed disk 526, may, in appropriate cases, be incorporated in standard fashion as virtual memory in memory 524. Removable disk 514 may take the form of any of the computer-readable media described below.

CPU 522 is also coupled to a variety of input/output devices such as display 504, keyboard 510, mouse 512 and speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon CPU 522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What we claim is:

1. A method of protecting data in a database utilized by an application that is vulnerable to SQL injection, the method comprising:

receiving a SQL statement at a SQL injection prevention module within the application;

identifying a SQL command sequence within the SQL statement;

comparing the SQL command sequence with a SQL pattern contained in a database security policy, wherein the database security policy includes a violation severity level;

determining that there is a match between the SQL command sequence and the SQL pattern, such that there is a violation of the database security policy by the SQL statement;

determining if the violation severity level of the database security policy is critical or non-critical; and permitting the SQL command sequence to execute and encrypting a result of the execution of the SQL command sequence when there is a match between the SQL command sequence and the SQL pattern and the violation severity level is non-critical.

2. A method as recited in claim 1 wherein identifying a SQL command sequence further comprises:
scanning the SQL statement.

3. A method as recited in claim 1 further comprising:
ensuring that up-to-date database security policies are loaded into a policies database.

4. A method as recited in claim 1 wherein the violation severity level indicates a level of risk associated with the SQL statement being allowed to access the database associated with the application, wherein the SQL statement is identified as a form of a SQL injection when there is a match between the SQL command sequence and the SQL pattern.

5. A method as recited in claim 1 wherein the SQL pattern is one of a pattern of SQL variables, a pattern of SQL variables and commands, a pattern of SQL variables, commands and conditional logic, and a pattern of SQL variables, commands, conditional logic and parameters, which when identified in a SQL statement is potentially harmful.

6. A method as recited in claim 1 further comprising:
transmitting a data set to the user application, the data set resulting from the SQL statement executing and retrieving data from the database, wherein a portion of the data set is encrypted based on confidential settings in a configuration file specifying which data of said database should be encrypted.

7. A method as recited in claim 1 further comprising:
implementing a visual console by a data registry module, said data registry module being further arranged to scan said database and list all schemas of the database in a visual format in said visual console.

8. A method as recited in claim 1, further comprising:
forbidding the SQL command sequence to execute when there is a match between the SQL command sequence and the SQL pattern and the severity level of the violation of the database security policy is a critical violation.

9. The method of claim 1, wherein the encrypted result is to be decrypted by only a legitimate user of the result.

10. A computing system preventing harmful effects from SQL injection, the system comprising:
a processor;
a SQL injection prevention module for thwarting attempts to cause harm to the computing system through SQL injection;
a SQL scanner module for scanning a SQL statement received from an application executing on the processor;
a logger module for providing one or more SQL injection policies;
a confidential data encryption module for encrypting confidential data retrieved from a database to form a result of executing a SQL statement when it is determined that the SQL statement violates a policy and that the policy violation is a non-critical violation wherein said encrypting uses a feature that is known only to the owner or user of the confidential data; and
a memory storage area storing
one or more SQL injection policies, and
a configuration file identifying said confidential data in the database, said configuration file being generated by a data registry module and wherein said confidential data encryption module uses said configuration file,
wherein the SQL statement is compared with the one or more SQL injection policies to determine whether the SQL statement violates any of the one or more SQL injection policies.

11. A computing system as recited in claim 10 further comprising:
database access drivers which return data to the confidential data encryption module.

12. A computer system as recited in claim 11 wherein database access drivers specifically for the injection prevention module provides application programming interfaces (APIs) and drivers needed by the application to retrieve data from the database and that replace conventional API and drivers normally used by the application.

13. A computing system as recited in claim 10 further comprising:
a maintenance service module that communicates with logger module.

14. A computing system as recited in claim 10 wherein the SQL scanner module examines the one or more SQL injection policies thereby also determining a security violation level.

15. A computing system as recited in claim 10 further comprising:
a confidential user interface component that enables an application developer to enter information on which data stored in a database is confidential.

16. A computer system as recited in claim 10 wherein the data registry module implements a visual console, said data registry module being further arranged to scan said database and list all schemas of the database in a visual format in said visual console.

17. The computing system of claim 10, wherein the encrypted confidential data is to be decrypted by only a legitimate user of the result.

18. The computing system of claim 10, wherein the SQL statement is identified as a form of SQL injection where there is a match between the SQL statement and at least one of the SQL injection policies.

19. A method of blocking SQL injections into a user application that utilizes a database, comprising:
receiving a SQL statement at a SQL injection prevention system in the user application;
comparing the SQL statement against policies relating to SQL injections, said policies containing SQL patterns;
determining whether the SQL statement violates any of the policies; and
allowing the SQL statement to execute and encrypting a result of the execution of the SQL statement when it is determined that there is a violation of a low security level;
wherein the database utilized by the application is protected from malicious SQL statements.

20. A method as recited in claim 19 further comprising:
scanning the SQL statement; and
identifying SQL command sequences within the SQL statement that violate a SQL command pattern in the policies.

21. A method as recited in claim 19 wherein the policies relating to SQL injections include a SQL command pattern.

22. A method as recited in claim 21 wherein the SQL command pattern is one of a pattern of SQL variables, a pattern of SQL variables and commands, a pattern of SQL variables, commands, and conditional logic, and a pattern of SQL variables, commands, conditional logic and parameters, which when identified in a SQL statement is potentially harmful.

23. A method as recited in claim 19 further comprising:
examining a configuration file storing confidential settings to determine whether data retrieved from the database is confidential, said configuration file generated by a data registry module.

24. A method as recited in claim 19 further comprising:
transmitting a data set to the user application, the data set resulting from the SQL statement executing and retrieving data from the database, wherein a portion of the data set is encrypted based on confidential settings in a configuration file specifying which data of said database should be encrypted.

25. A method as recited in claim 24 further comprising:
utilizing a confidential data encryption module for encrypting confidential data in the data set.

26. A method as recited in claim 24 further comprising:
enabling an application developer to select which data in the database is confidential using a visual representation of the database.

27. A method as recited in claim 24 wherein an encryption algorithm to encrypt the data of said database uses a feature local or specific to a legitimate owner or user of the data.

28. A method as recited in claim 19 wherein allowing the SQL statement to execute further comprises:
notifying the administrator that a first security level violation has occurred; and
transmitting a trace of the violation to the administrator.

29. A method as recited in claim 19 further comprising:
loading new policies relating to SQL injections into a policies repository accessed by a SQL scanner.

30. A method as recited in claim 19 further comprising:
enabling the administrator to specify which data is confidential utilizing a confidential data registry interface.

31. A method as recited in claim 19 further comprising:
ensuring that up-to-date policies relating to SQL injections are loaded into a policies database.

32. A method as recited in claim 19, wherein the SQL statement has been identified as a form of SQL injection when the SQL statement is determined to violate at least one of the policies.

33. A method as recited in claim 19 further comprising:
implementing a visual console by a data registry module, said data registry module being further arranged to scan said database and list all schemas of the database in a visual format in said visual console.

34. The method of claim 19, wherein the encrypted result is to be decrypted by only a legitimate user of the result.

* * * * *